United States Patent [19]

Chandra et al.

[11] Patent Number: 4,622,635

[45] Date of Patent: Nov. 11, 1986

[54] PORTABLE DISPLAY AND CONTROL TERMINAL FOR WELLS

[75] Inventors: Rangasami S. Chandra, Walnut Creek; Jose F. Reyes, Newark, both of Calif.

[73] Assignee: Automated Controls Inc., Denver, Colo.

[21] Appl. No.: 579,746

[22] Filed: Feb. 13, 1984

[51] Int. Cl.[4] .................. G06F 15/20; G02F 1/13
[52] U.S. Cl. .................. 364/422; 346/33 WL; 350/331 T; 166/53
[58] Field of Search ........ 364/400, 420, 422, 505–507, 364/710; 166/53, 65 R, 250; 346/33 WL; 417/1, 15, 18, 33, 44–45, 53, 63; 350/330, 331 R, 331 T, 332–333, 345, 351

[56] References Cited

U.S. PATENT DOCUMENTS

| | | | |
|---|---|---|---|
| 3,770,961 | 11/1973 | Westell | 350/351 |
| 4,031,529 | 6/1977 | Borel et al. | 350/351 |
| 4,104,727 | 8/1978 | Washizuka et al. | 364/710 |
| 4,115,870 | 9/1978 | Lowell | 364/710 |
| 4,242,679 | 12/1980 | Morozumi et al. | 350/331 T |
| 4,264,148 | 4/1981 | Göbl-Wunsch et al. | 350/351 |
| 4,307,395 | 12/1981 | Standish | 346/33 WL |
| 4,338,600 | 7/1982 | Leach | 350/331 T |
| 4,390,874 | 6/1983 | Woodside et al. | 350/331 T |
| 4,460,247 | 7/1984 | Hilsum et al. | 350/331 T |
| 4,487,061 | 12/1984 | McTamaney et al. | 166/53 X |

*Primary Examiner*—Gary V. Harkcom
*Attorney, Agent, or Firm*—Christie, Parker & Hale

[57] ABSTRACT

A portable terminal for plugging into a well production control system for displaying data from the control system and for entering data into the control system. A liquid crystal display module on the terminal displays both graphic and printed data. A keyboard on the terminal provides a means for entering data and control signals into the control system. A temperature compensating circuit adjusts the brightness contrast on the display module so the terminal can be used outdoors over a wide range of temperatures.

7 Claims, 5 Drawing Figures

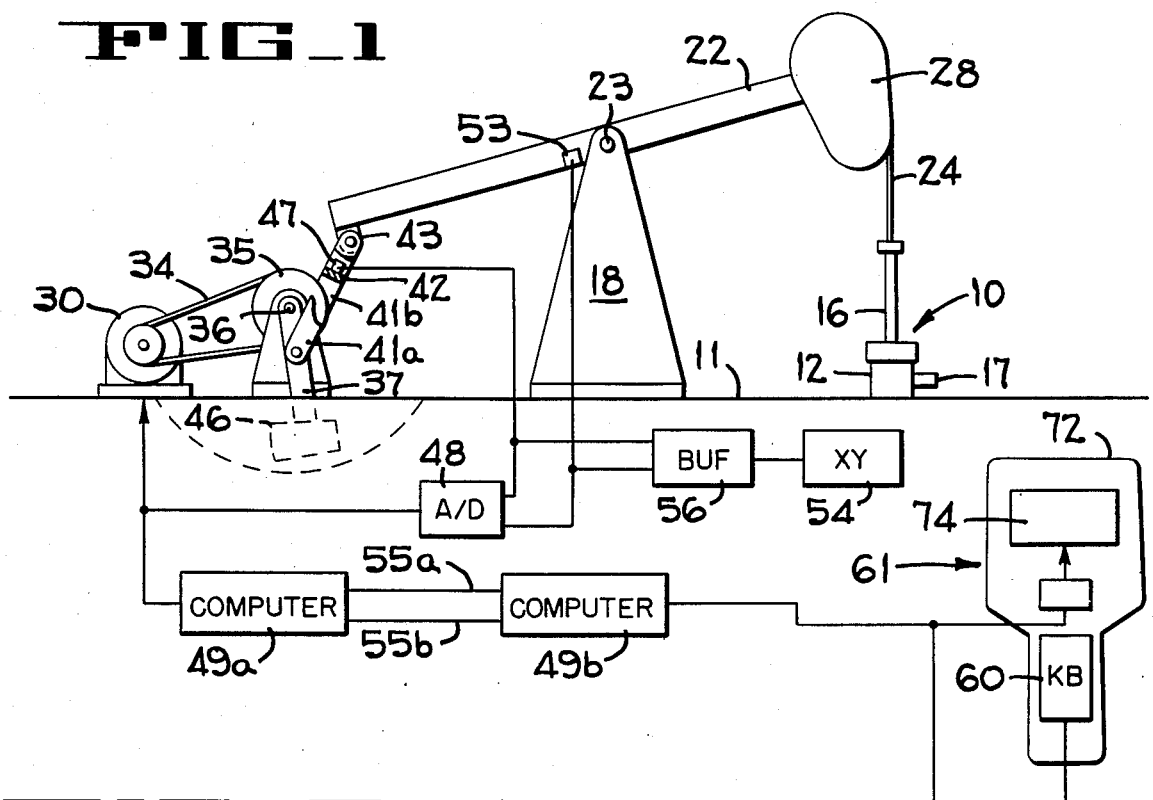
FIG_1
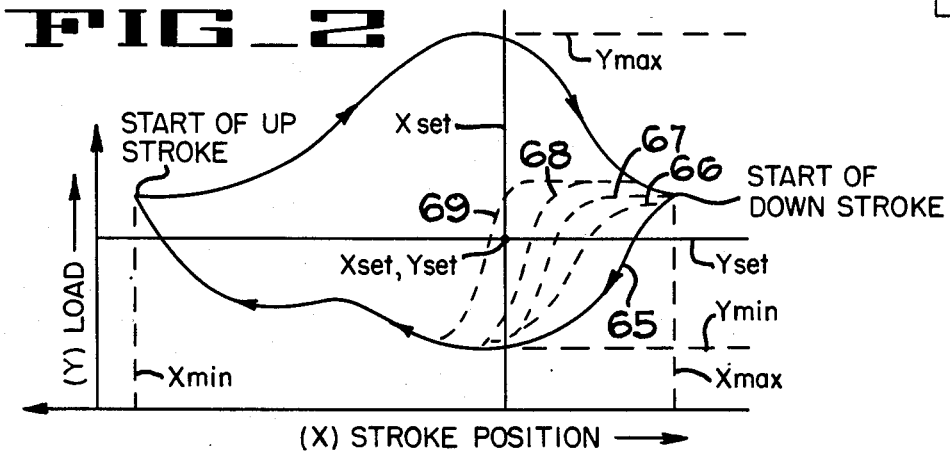
FIG_2
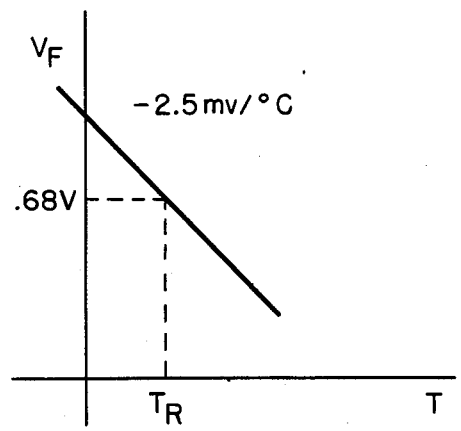
FIG_3

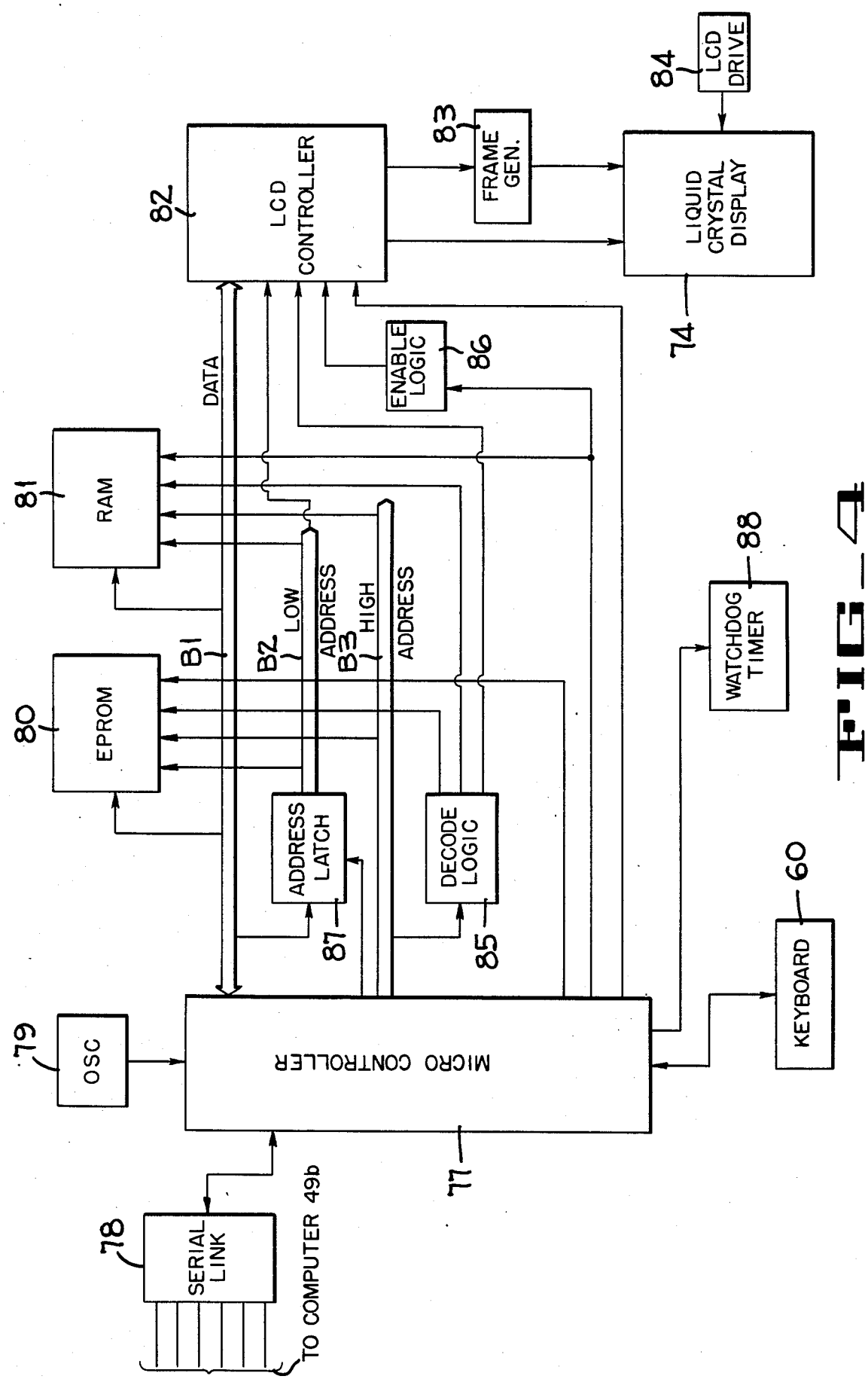
FIG_4

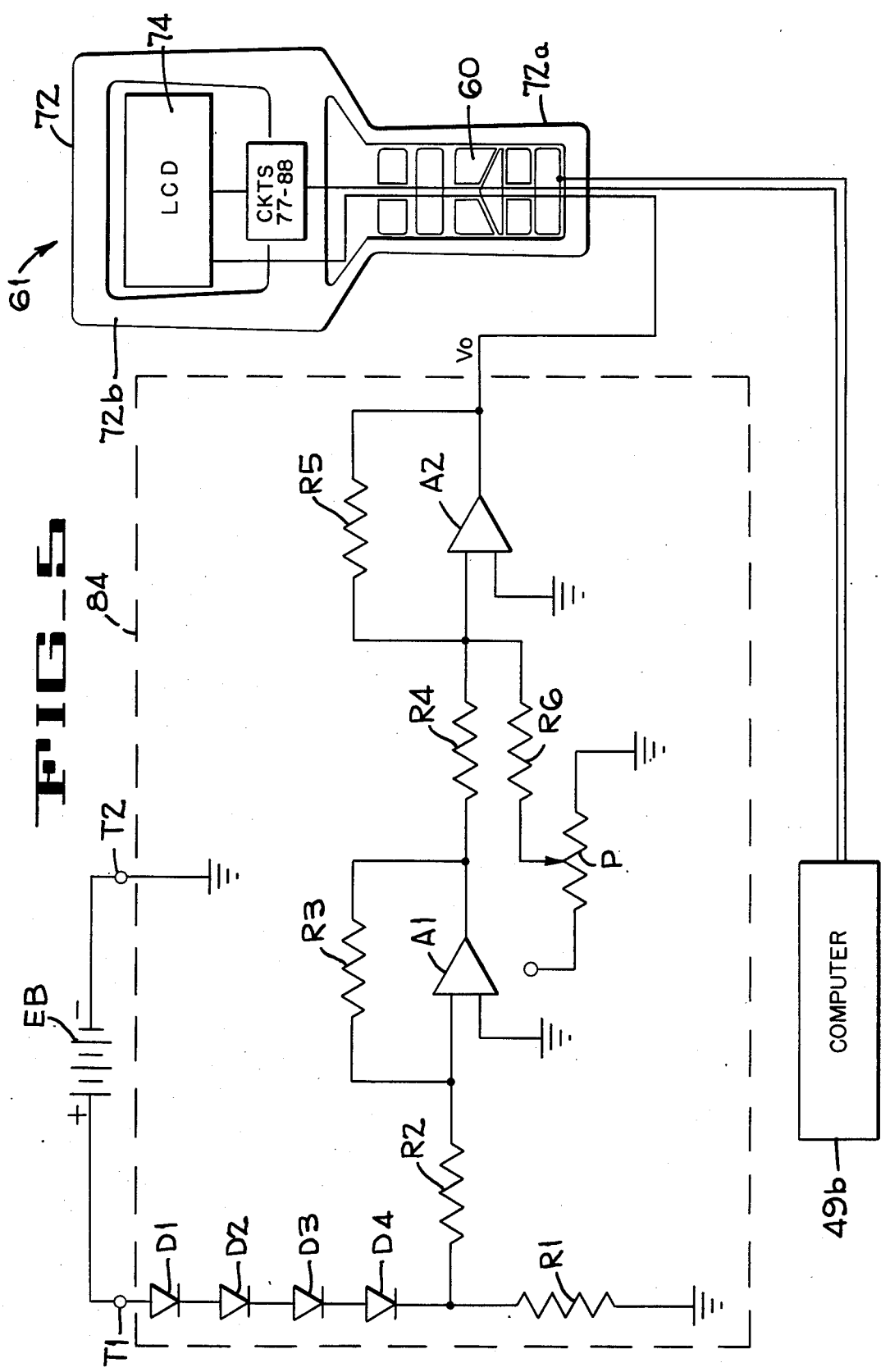
FIG_5

PORTABLE DISPLAY AND CONTROL TERMINAL FOR WELLS

BACKGROUND OF THE INVENTION

The present invention relates to method and apparatus for monitoring the operation of sucker-rod well pumping units, and more particularly to a portable terminal for displaying well operating characteristics and for providing control signals to pumping units.

Sucker-rod type pumping units are widely used in the petroleum industriy to recover fluid from wells extending into subterranean formations. Such units include a sucker-rod string which extends into the well and means at the surface for an up-and-down movement of the rod string in order to operate a downhold pump. Typical of such units are the so-called "beam-type" pumping units having the sucker-rod string suspended at the surface of the well from a structure consisting of a Samson post and a walking beam pivotally on the Samson post. The sucker-rod string normally is connected at one end of the walking beam and the other end of the walking beam is connected to a prime mover such as a motor through a suitable equalizer bar connected to a crank and pitman connection. In this arrangement the walking beam and the sucker-rod string are driven in a reciprocal mode by the prime mover.

A variety of malfunctions such as worn pumps, broken sucker-rods, split tubing, and stuck pump valves can interrupt the pumping of fluid from a well. Such malfunctions can be caused by normal wear and tear on the equipment, by the nature of the fluid being pumped or they could be caused by abnormal pumping conditions.

One abnormal pumping condition which is fairly common is known as "fluid pound". Fluid pound occurs when the well is pumped-off, i.e., when fluid is withdrawn from the well at a greater rate than the rate at which fluid enters the well from the formation. When this occurs, the working well of the downhold pump is only partially filled during an upstroke of the plunger and on the downstroke the plunger strikes or "pounds" the fluid in the working barrel causing severe jarring of the entire pumping unit. This causes damage to the rod string and to the surface equipment and may lead to failure of the pumping unit.

SUMMARY OF THE INVENTION

The present invention provides a portable terminal for displaying characteristics of a well and for providing control signals to a pumping unit. The portable terminal can be removably connected to well pumping apparatus having a sucker-rod string and a power unit to reciprocate the rod string to produce fluid from a well. A load cell is connected on an equalizer bar between the sucker-rod string and the power unit to develop a signal representative of the load on the rod string, and the transducer is connected to generate a signal representative of the position of the rod string. A computer uses a load signal to establish a selected value of this load signal and uses the rod string position to establish a reference position of the rod string. Means are provided for monitoring the load signal when the rod string reaches the reference position and means are provided for disabling the power unit when an absence of fluid below the pump plunger causes the load signal to exceed the selected value with the rod string at the reference position.

The portable terminal includes a microcomputer which uses signals from the load cell and position transducer to operate a liquid crystal module which plots a graph of rod string load versus rod string position and displays well parameters. The portable terminal also includes a keyboard for entering system control parameters into the well control system and for selecting the well parameters displayed on the liquid crystal module.

The brightness of the liquid crystal display module varies greatly with a significant change in operating temperature so a brightness control circuit is used to enable the portable terminal to be used in an outdoor environment where the temperature may vary over a considerable range.

BRIEF DESCRIPTION OF THE DRAWINGS

FIG. 1 is a diagrammatic illustration of the portable terminal of the present invention connected to a well equipped with a sucker-rod type pumping unit.

FIG. 2 is a plot of position versus load of the sucker-rod of the pump for one cycle of normal operation and the dotted line shows the change as the well progresses into fluid pound.

FIG. 3 is a plot of voltage versus temperature characteristics of diodes used to compensate for a change in temperature which causes a change in brightness of the liquid crystal display module used in the present invention.

FIG. 4 is a block diagram of the circuitry of the portable display terminal of the present invention.

FIG. 5 is a diagram of the brightness control circuit of the present invention which is used to compensate for the change in brightness of the liquid crystal display module of the present invention.

DESCRIPTION OF THE PREFERRED EMBODIMENT

Referring to FIG. 1, there is illustrated a wellhead 10 of a well which extends from the earth's surface 11 into a subsurface well producing formation (not shown). The wellhead comprises the upper portions of a casing string 12 with a sucker-rod string 16 extending downward into a down hole pump (not shown) which moves liquid to the surface where it passes into a flow line 17. The sucker-rod string 16 is suspended in the well from a support unit consisting of a Samson post 18 and a walking beam 22 which is pivotally mounted on the support post by a pin connection 23. A cable section 24 is conneced between the upper end of the sucker-rod string 16 and the lower end of a horsehead 28. The cable section 24 is connected to the walking beam 22 by means of the horsehead 28.

The walking beam 22 is reciprocated by a prime mover such as an electric motor 30. The prime mover drives the walking beam through a drive system which includes a drive belt 34, crank 35, crank shaft 36, a pair of crank arms 37 (only one shown), and a pair of pitmans 41a, 41b which are pivotally connected between the crank arm and the walking beam by means of an equalizer bar 42 and an equalizer bearing 43 (FIG. 1). The outer end of the crank arms 37 are provided with a counterweight 46 which balances a portion of the load on the sucker-rod string in order to provide a more constant load on the prime mover. A load cell 47 is clamped or otherwise connected to the equalizer bar 42 at a position between the equalizer bearing 43 and the pitman 41a. The load cell 47 develops a signal due to the slight bending of the equalizer bar 42 caused by the load on the sucker-rod string 16. The amount of bending of the equalizer bar 42 is determined by the amount of load on the rod string 16 (FIG. 1).

The load cell 47 provides a DC output signal which is proportional to the load on the sucker-rod string 16, and an analog-to-digital converter 48 provides a corresponding digital signal to a computer 49a. A position measuring means or transducer 53 measures the vertical position of the sucker-rod string 16 by providing a voltage which is proportional to the angle of the walking beam 22 and thus is proportional to the position of the rod string 16. The analog-to-digital converter 48 converts the multiplex signals from the transducers 47 and 53 into digital signals which are used by the computer 49a. The analog signals from the transducers 47, 53 are also coupled through a buffer 56 and used by an XY plotter 54 to provide a "hard" copy of the characteristics of the particular well which the rod string operates. The computers 49a, 49b communicate electrically with each other, in a serial fashion, over a pair of wires 55a, 55b. The portable terminal keyboar 60 and an associated graphic display 74 are used by a human operator to observe and set up the well parameters.

A plot of the position versus load of the rod string 16 for a typical cycle of the rod string when the well is filled with fluid is disclosed in the solid line graph of FIG. 2. It can be seen that as the rod string moves on the upstroke from Xmin position to the Xmax position, the load on the string increases to a maximum value and then returns to approximately the initial value. Of more importance is the variation in the load as the rod string moves downward with the load decreasing to a minimum value at a fairly rapid rate and then moving upward to approximately the original value at the Xmin position.

As the well approaches pump-off (FIG. 2), the load on the rod string changes more rapidly as the rod string moves in a downward direction. When the fluid in the well drops, a pump plunger in the pump falls and strikes the surface of the fluid in the well producing a "fluid pound" which can damage the rod string and other parts of the pumping system. As the fluid level in the well decreases the pump plunger progressively moves a greater distance on the downstroke before contacting the surface of the fluid in the well causing the plotted load curve to progressively change from the full well curve 65 to the dotted curves 66–69 with the curve moving progressively toward the left as the fluid in the well drops lower. This moving trend can be observed and the pump shut down to prevent damage to the equipment.

The present invention provides a method for detecting pump-off by using the apparatus of FIG. 1 to select a set point (Xset, Yset) (FIG. 2) having a value determined by the characteristics of each individual well and to change the set point when these characteristics change and/or when the characteristics of the load cell 47 and/or of the transducer 53 change. The computer 49a (FIG. 1) compares the fluid pound curves 66–69 with the position of the set point and shuts down the motor 30 when the fluid pound curve moves to the left of the set point shown in FIG. 2.

A human operator uses the keyboard 60 of the graphic display terminal 61 (FIG. 1) to enter an X percentage value and a Y percentage value into the computer 49b which transfers these values to the computer 49a causing the computer 49a to calculate an Xset value the entered percent of the distance between Xmin and Xmax (FIG. 2), and to calculate a Yset value the entered percent of the distance between Ymin and Ymax thereby obtaining the position of the set point. The value of Xset and Yset can be computed using the following formulae:

$$Xset = (Xmax - Xmin)(X\% \mp 100) + Xmin$$

$$Yset = (Ymax - Ymin)(Y\% \mp 100) + Ymin$$

The values of Xmax, Xmin, Ymax and Ymin which can be used are the maximum and minimum values of the curve of FIG. 2. The X% and Y% are the percentage values selected by the human operator using knowledge of the well and of the pumping equipment in choosing these percentage values. Also any two nominal values of X and any two nominal values of Y can be selected instead of using the maximum and minimum values suggested.

When the set point (Xset, Yset) has been selected the computer continually monitors the X value of the curve (FIG. 2) during the downstroke of the plunger until the curve reaches the value of Xset as the curve moves from Xmax toward Xmin. With the curve at Xset point the computer checks the value of Y. If the value of Y is greater than the value of Yset the computer 49a (FIG. 1) provides a signal which causes the motor 30 to stop and the well is shut down. To insure that the well is really pumped-off at this time, it may be desirable to allow the pump to move through two or more cycles with the curve (FIG. 2) to the left of the set point each time, before the motor 30 is turned off. This prevents shut down of the well due to an erratic signal from the load cell 47 or from the transducer 53 or from other electronic equipment or from the behavior of the well itself. Details of a method and apparatus for automatically calibrating a well and for monitoring operation thereof are disclosed in a copending U.S. patent application entitled "Well Production Control System" Ser. No. 579,628 filed by R. S. Chandra et al for which a Notice of Allowance was issued by the U.S. Patent and trademark Office on Jan. 9, 1985.

The portable terminal 61 (FIGS. 1, 5) includes a hollow molded case 72 having a narrow handle portion 72a with a keyboard 60 mounted thereon and a liquid crystal display module (LCD) 74 mounted on a wider body portion 72b of the case 72. A plurality of circuit elements 77–88 (FIG. 4), for operating the LCD module 74 and for supply control signals to the computer 49b, are mounted inside the hollow case 72. A human operator can hold the case 72 by the handle 72a with one hand and use the other hand to operate the keyboard 60. A load vs. stroke position (FIG. 2) dynagraph of a well can be displayed on the LCD module 74 upon request and other well parameters can also be displayed on the LCD module. Control signals to select values of Xset, Yset (FIG. 2), to select off time of the motor 30 (FIG. 1), run time of the motor 30 and a variety of other control parameters for the well operating apparatus of FIG. 1 can also be entered into the system by the terminal keyboard 60 (FIG. 5). A human operator can unplug the terminal 61 from the computer 49b and use the same terminal to monitor and/or control other similar pumping apparatus. The portable terminal 61 is a general purpose terminal which can be used for a variety of industrial jobs involving computers by including appropriate software. The terminal 61 can use a serial link to communicate with computers.

A microcontroller 77 (FIG. 4) communicates with the computer 49b (FIGS. 1, 5) through a serial link 78. A microcontroller which can be used in the present invention is the Model 8031 made by Intel Corporation, Santa Clara, Calif. and includes an internal computer and a link for sending and receiving messages.

Clock pulses for driving the microcontroller 77 are provided by a crystal controlled oscillator 79. Programs for operating the microcontroller 77 and the liquid cystal display module 74 are stored in an EPROM 80, and data for use in the system is stored in a RAM 81. The microcontroller 77 supplies data and commands to an LCD controller 82 which converts the data and commands into dot data for operating the liquid crystal display module 74. A frame generator 83 uses signals from the LCD controller to provide frame voltages to the display module and an LCD drive section 84 provides drive voltages for the display module. The LCD drive section generates an appropriate voltage to maintain a constant degree of brightness of the LCD, independent of any temperature variation. An LCD controller which can be used is the Model HD61830 made by Hitachi Limited, Tokyo, Japan, and a LCD module which can be used is the Model DMF601 made by Optrex Corporation, Tokoyo, Japan.

A decode logic circuit 85 provides logic signals to the EPROM 80, RAM 81 and LCD controller 82, and an enable logic circuit 86 provides enable pulses to operate the LCD controller 82. An address latch 87 provides low address signals to a low address bus B2 for use by the EPROM 80, RAM 81 and LCD controller 82 and a bus B1 carries data to these units. The microcontroller 77 retriggers a watchdog timer 88 at a fixed rate when the module is working properly. If the microcontroller 77 fails to retrigger the timer a warning signal is generated to indicate a system failure.

The contrast between the bright displayed information on the screen and the background of the LCD module decreases as temperature of the module decreases. The LCD drive circuit 84 (FIGS. 4, 5) provides a compensating voltage Vo which increases the cold weather contrast on the screen of the LCD module so the portable terminal 61 can be used outdoors in cold weather. A plurality of diodes D1–D4 and a resistor R1, connected in series between a pair of output terminals T1, T2 of a source of potential EB, (FIG. 5) provide a negative voltage-versus-temperature characteristic of approximately $-2.5m$ $V/°C$ as shown in FIG. 3. The voltage across each of the diodes is approximately 0.68 volts at a normal room temperature Tr. A plurality of resistors R2–R6, a potentiometer P and a pair of amplifiers A1, A2 increase the rate of variation in voltage to a value of approximately $-50m$ $V/°C$ which is coupled to the LCD to keep the brightness contrast of the LCD module substantially constant over a normal range of operating temperatures.

The present invention provides a portable terminal which can be plugged into a well production control system for both displaying data from the control system and for entering control signals into the control system. A liquid crystal display module on the terminal provides both a graphic and a printed display of system information. A keyboard on the terminal provides a means for entering data and control signals into the system. A temperature compensation circuit porvides sufficient brightness contrast in the display module so the terminal can be used over a wide range of operating temperatures. The flat liquid crystal display module provides a wide range of pictures, graphs and data, and can be used as a general purpose terminal that can be used in a hot or a cold environment.

Although the best mode contemplated for carrying out the present invention has been herein shown and described, it will be apparent that modification and variation may be made without departing from what is regarded to be the subject matter of the invention.

What is claimed is:

1. A portable graphic display terminal for use with a well production control system having a first transducer for generating a signal representative of a load on a sucker-rod string and a second transducer for generating a signal representative of a position of said rod string, said terminal having means for monitoring well conditions and for supplying control parameters to said control system, said terminal comprising:
   a liquid crystal display module for displaying data from said control system;
   keyboard means for entering display command signals and system control signals into said terminal;
   means for connecting said terminal to said control system;
   a source of potential having first and second output terminals; and
   a temperature compensating circuit connected between said display module and said first output terminal for supplying an operating voltage to said display module which keeps the brightness contrast of said display module substantially constant over a range of operating temperatures, said temperature compensating circuit including:
   a plurality of diodes each having an anode and a cathode,
   means for connecting the anode of a first diode to said first output terminal of said source,
   means for serially connecting the diodes with the anode of each of the other diodes connected to the cathode of an adjacent diode,
   an electrical impedance connected between said second output terminal of said source and the cathode of a last of said diodes, and
   means for connecting said cathode of said last diode to said crystal display module.

2. A portable terminal as defined in claim 1 including means for using said keyboard to enter data into said terminal and means for using said entered data to control operation of said production control system.

3. A portable terminal as defined in claim 1 including means for using said load signal and said position signal to produce a dynagraph of well operation on said crystal display module in response to said command signals.

4. A portable terminal as defined in claim 1 including a plurality of keyboard switches, and processor means for entering control signals into said control system in response to manipulation of said keyboard switches.

5. A portable terminal as defined in claim 1 including a hollow case having a narrow handle portion and a wider body portion.

6. A portable terminal as defined in claim 5 including a plurality of integrated circuits for using said command signals and said control signals to operate said display module, and means for mounting said integrated circuits inside said hollow case.

7. A portable terminal as defined in claim 1 wherein said operating voltage is a d.c. voltage.

* * * * *